April 25, 1939.  R. J. ANSCHICKS  2,155,464
WASH TANK
Filed Dec. 18, 1937  2 Sheets-Sheet 1

Inventor:
Rudolph J. Anschicks

April 25, 1939.   R. J. ANSCHICKS   2,155,464
WASH TANK
Filed Dec. 18, 1937   2 Sheets-Sheet 2
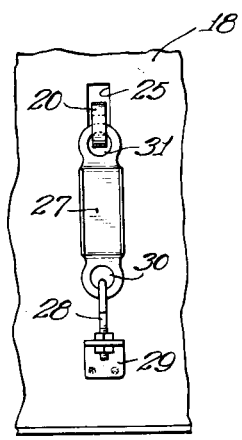
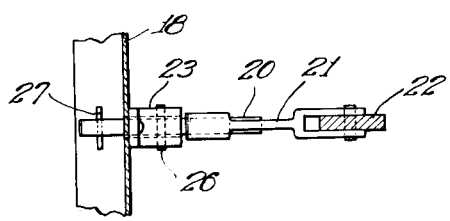

Patented Apr. 25, 1939

2,155,464

UNITED STATES PATENT OFFICE 2,155,464

WASH TANK

Rudolph J. Anschicks, Chicago, Ill., assignor to Protectoseal Company of America, Inc., Chicago, Ill., a corporation of Illinois Application December 18, 1937, Serial No. 180,599

3 Claims. (Cl. 220—89)

The invention relates to wash tanks or receptacles and more particularly it relates to tanks or receptacles for volatile liquids in which articles may be dipped or submerged and thereby subjected to the cleansing properties of the liquids.

The invention has among its objects the production of devices of the kind described which are convenient, safe, durable, and satisfactory for use wherever found applicable.

A particular object of the invention is to provide a tank or receptacle of the kind described having improved means automatically operable to quickly stop combustion of the fluid contents of the tank in the event of ignition by accident or otherwise.

Many other objects and advantages of the construction herein shown and described will be obvious to those skilled in the art from the disclosure herein given.

To this end my invention consists in the novel construction, arrangement, and combination of parts herein shown and described and more particularly pointed out in the claims.

In the drawings wherein like reference characters indicate like or corresponding parts:

Fig. 3 is a view along the line 3—3 of Fig. 1; and

Fig. 4 is a view along the line 4—4 of Fig. 1.

Figure 1:
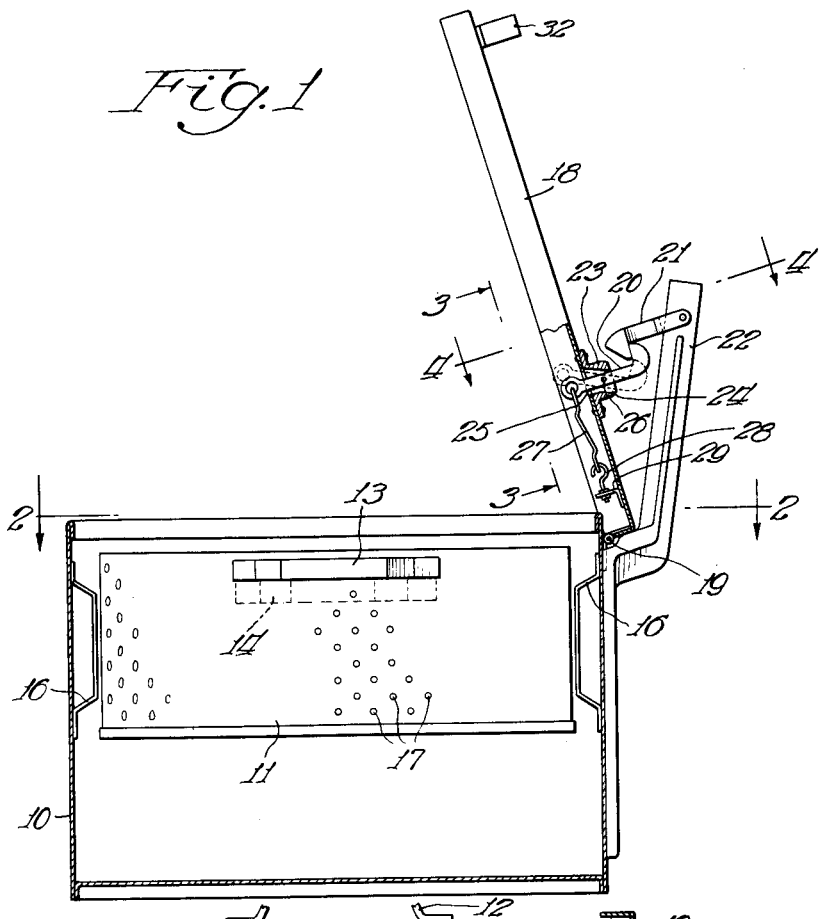
Fig. 1 is a vertical view through a tank embodying the principles of the invention, the cover of the tank being shown partially in section and in open position.
Figure 2:
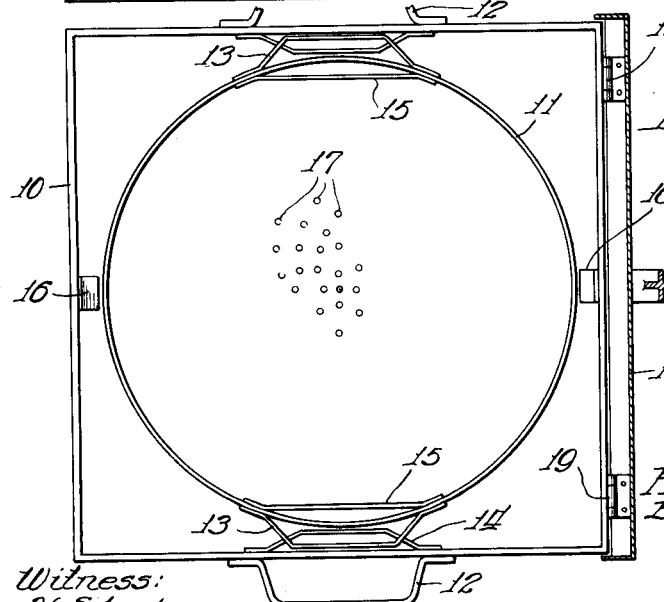
Fig. 2 is a view along the line 2—2 of Fig. 1.

Referring now more particularly to the drawings wherein like reference numerals indicate like or corresponding parts, the numerals 10 and 11 respectively designate a wash tank, and a screen basket, adapted as a receptacle for articles to be cleaned. The tank 10 is shown as rectangular in cross section and is provided with a pair of bars forming handles 12 suitably projecting from and positioned on opposite sides of the tank.

The basket 11 is shown as cylindrical but may be rectangular or of any other suitable cross section. The basket 11 is provided with a pair of oppositely positioned outside handles 13 shown as respectively overlapping and resting upon supporting elements 14, the elements being suitably fastened to the opposite side walls of the tank 10. A pair of bars 15, positioned inside of and fastened to the basket 11 by welding or any other suitable means, provides additional handles by means of which the basket may be lifted from the positions shown and be otherwise manipulated.

A pair of vertically extending bars 16 oppositely positioned in the tank 10 have their ends fastened to the tank by welding or the like. The middle portions of the bars 16 project inwardly to provide spacers for the basket 11 when it is suspended from the elements 14. The end portions of the bars 16 are inclined to provide guides for the basket during its insertion and removal from the tank 10.

The basket 11 is adapted as a receptacle for articles to be cleaned and is provided with a plurality of apertures 17 in its side and bottom walls as shown. In practice, the tank 10 is partially filled with volatile cleaning liquid and the basket 11, containing the articles to be cleaned, is lowered to the bottom of the tank with the handles 13 positioned adjacent to opposite corners of the tank to clear the supporting elements 14. Upon completion of the dipping or submerging of the articles in the tank liquid, the basket is lifted and suspended from the top of the tank by engagement of the handles 13 with the elements 14 to permit drainage of the basket and the articles contained therein.

The tank 10 is provided with a suitable cover 18 tiltable from open to closed position and vice versa about a pivot 19. The tank fluid being volatile and exposed to accidental ignition when the cover 18 is open, means is provided whereby such ignition permits the cover to close by gravity and stop combustion. The cover 18 is normally held in open position, wherein it tends to close by gravity as shown, by the operative engagement of latch members 20 and 21. The member 21 is pivotally mounted on a back support 22 fastened to and projecting upwardly from the tank 10. The member 20 is mounted on a member 23, attached to the outside of the cover 18, and extends through an aperture 24 provided by the member 23 and through an aperture 25 provided by the cover in registry with the aperture 24. The pivoted end of the latch member 21 provides a fork extending on opposite sides of the support 22 with the juncture of its fork portions arranged to rest on the support and prevent further tilting movement of the member downwardly from the position shown. The latch member 20 is connected with the member 23 by a pin 26 extending through the aperture 24. Tilting of the member 20 about the pin 26 is normally prevented by a rigid fusible link 27 having its lower end fastened to the cover 18 by any suitable means such as a hook 28 extending through an aperture 30 in the link and an angle member 29 connecting the hook with the cover. The upper end of the link 27 is provided with an aperture 31 through which the inner curved end of the member 20 projects and normally maintains the member in its full-line position and prevents tilting thereof about the pin 26.

The cover 18 may be moved to open position by manipulation of a handle 32. Opening of the cover 18 moves the outer curved face of the latch member 20 to engage the inclined end face of the latch member 21 to act as a cam and thereby tilt the member 21 upwardly to permit the member 20 to take its full-line position. The member 21 then moves by gravity to its full-line position wherein it operatively engages the member 20 and prevents the cover 18 from closing by gravity. The cover 18 is normally closed by manually lifting the member 21 to disengage the member 20.

The link 27 is fusible at low temperatures and in the event of ignition of the volatile contents of the tank or the gases emanating therefrom, the link is almost instantaneously fused and severed by the heat generated by combustion. The severance of the link 27 permits the latch member 20 to drop to its dotted line position wherein the cover 18 then moves by gravity to its closed position and stops combustion.

Thus, it will be seen that the invention provides improvements in devices normally holding tank or receptacle covers in an open position wherein they tend to close by gravity and permitting the covers to be manually opened and closed, said devices being automatically operated to permit such covers to close by gravity to stop combustion as a result of ignition of volatile fluid contents of the tank.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A wash tank of the kind described having a hinged cover arranged to close by gravity, a latch member tiltably mounted on the cover, a fusible element mounted on the inside of the cover operatively related to said latch member to prevent tilting thereof, a latch member mounted on the tank adapted to operatively engage said cover latch member and hold the cover open, said element when fused permitting said cover latch member to move by gravity to disengage the tank latch member and the cover thereby to be closed by gravity.

2. A wash tank of the kind described having a hinged cover, a member adapted to stop the cover at an open position wherein it will close by gravity, a latch member tiltably mounted on the cover, a latch member tiltably mounted on the stop member adapted to operatively engage said cover latch member and thereby hold the cover open, an element positioned on the inside of the cover operatively engaging said cover latch member to prevent tilting thereof, said element being fusible by heat generated by initial combustion of volatile fluid contents of the tank and thereby permitting said cover latch member to move by gravity to disengage the tank latch member.

3. A wash tank of the kind described having a hinged cover, a member adapted to stop the cover at an open position wherein it will close by gravity, means normally adapted to hold the cover in said open position, said means comprising a latch member tiltably mounted on the cover, a fusible element mounted on the inside of the cover and connected with said latch member to prevent tilting thereof, a latch member mounted on the tank adapted to operatively engage said cover latch member to hold the cover open, said cover latch member being movable by gravity to disengage the tank latch member upon fusing of said element and thereby permitting the cover to close.

RUDOLPH J. ANSCHICKS.